US011660671B2

(12) United States Patent
Wertz et al.

(10) Patent No.: US 11,660,671 B2
(45) Date of Patent: May 30, 2023

(54) HYBRID-ADDITIVE GEAR FOR A WIND TURBINE GEARBOX

(71) Applicant: General Electric Company, Schenectady, NY (US)

(72) Inventors: Aaron Wertz, Cincinnati, OH (US); Raed Zuhair Hasan, Greenville, SC (US); Adam Daniel Minadeo, Greenville, SC (US); Souvik Porel, Bangalore (IN); Ganesh Raut, Bangalore (IN); Jeremy Charles Ridge, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 17/253,212

(22) PCT Filed: Jun. 21, 2019

(86) PCT No.: PCT/US2019/038453
§ 371 (c)(1),
(2) Date: Dec. 17, 2020

(87) PCT Pub. No.: WO2019/246510
PCT Pub. Date: Dec. 26, 2019

(65) Prior Publication Data
US 2021/0123418 A1   Apr. 29, 2021

(30) Foreign Application Priority Data

Jun. 21, 2018   (IN) .............................. 201841023143

(51) Int. Cl.
*B22F 5/08*   (2006.01)
*B33Y 80/00*   (2015.01)
(Continued)

(52) U.S. Cl.
CPC .................. *B22F 5/08* (2013.01); *B22F 7/08* (2013.01); *B22F 10/66* (2021.01); *B33Y 80/00* (2014.12);
(Continued)

(58) Field of Classification Search
CPC ......... B33Y 80/00; B33Y 10/00; B33Y 70/00; B22F 10/14; B22F 10/28; B22F 10/66; B22F 5/08; B22F 7/08; F03D 15/00
See application file for complete search history.

(56) References Cited

U.S. PATENT DOCUMENTS

2007/0104577 A1\* 5/2007 Hansen ................. F03D 7/0224
416/104
2012/0108380 A1\* 5/2012 Dinter ..................... F03D 80/70
475/159
(Continued)

FOREIGN PATENT DOCUMENTS

DE   10 2014 003441 A1   9/2015
DE   10 2015 005133 A1   10/2016
(Continued)

OTHER PUBLICATIONS

Saai Loganathan Pranava el al.: Supersonic particle deposition coatings for improved Tribological performance of offshore wind turbine gears, 2017 Asian Conference on Energy, Power and Transportation Electrification (ACEPT), Oct. 24, 2017 IEEE, pp. 1-7.
(Continued)

*Primary Examiner* — Moshe Wilensky
(74) *Attorney, Agent, or Firm* — Dority & Manning, P.A.

(57) ABSTRACT

A method for manufacturing a planet gear or a sun gear of a gearbox of a wind turbine includes forming a base of the planet gear via at least one of casting or forging. The base of the planet gear includes an inner circumferential surface and an outer circumferential surface. Therefore, at least one
(Continued)

of the inner circumferential surface or the outer circumferential surface of the planet gear includes a plurality of net or near-net gear teeth. The method also includes applying a coating material to at least a portion of the base of the gear and at least a portion of the plurality of gear teeth of the gear via an additive manufacturing process so as to increase a hardness of the portions of the base and the plurality of gear teeth that includes the coating material.

12 Claims, 10 Drawing Sheets

(51) Int. Cl.
*F03D 15/00* (2016.01)
*B22F 10/66* (2021.01)
*B22F 7/08* (2006.01)
*B33Y 10/00* (2015.01)
*B33Y 70/00* (2020.01)
*B22F 10/14* (2021.01)
*B22F 10/28* (2021.01)
*B22F 10/25* (2021.01)

(52) U.S. Cl.
CPC .............. *F03D 15/00* (2016.05); *B22F 10/14* (2021.01); *B22F 10/25* (2021.01); *B22F 10/28* (2021.01); *B22F 2302/105* (2013.01); *B22F 2302/253* (2013.01); *B33Y 10/00* (2014.12); *B33Y 70/00* (2014.12); *F05D 2230/21* (2013.01); *F05D 2230/31* (2013.01); *F05D 2240/50* (2013.01); *F05D 2260/40311* (2013.01); *F05D 2300/111* (2013.01); *F05D 2300/2112* (2013.01); *F05D 2300/2261* (2013.01); *F05D 2300/2263* (2013.01); *F05D 2300/2282* (2013.01)

(56) References Cited

U.S. PATENT DOCUMENTS

| | | | |
|---|---|---|---|
| 2014/0254970 A1* | 9/2014 | Guilford | F16C 43/065 |
| | | | 29/898.064 |
| 2016/0003339 A1 | 1/2016 | Roberts, III et al. | |
| 2017/0261087 A1 | 9/2017 | White et al. | |
| 2018/0106294 A1* | 4/2018 | Hiramatsu | F16C 33/62 |
| 2019/0136962 A1* | 5/2019 | Hasan | F03D 15/00 |

FOREIGN PATENT DOCUMENTS

| | | | |
|---|---|---|---|
| EP | 2630369 A1 | 8/2013 | |
| WO | WO 2004/022273 A2 | 3/2004 | |

OTHER PUBLICATIONS

PCT Search Report, dated Nov. 20, 2019.
First Examination Report for IN application No. 201841023143, dated Jul. 21, 2022.

* cited by examiner

HYBRID-ADDITIVE GEAR FOR A WIND TURBINE GEARBOX

FIELD

The present disclosure relates in general to wind turbines, and more particularly to a planet gears and/or sun gears for a wind turbine gearbox formed, at least in part, via additive manufacturing.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

The gearbox generally includes a gearbox housing containing a plurality of gears (e.g., planet, ring and/or sun gears) connected via one or more planetary carriers and bearings for converting the low speed, high torque input of the rotor shaft to a high speed, low torque output for the generator. In addition, each of the gears rotates about a pin shaft arranged within the one or more planetary carriers. The gearbox is then attached to the bedplate via a torque arm.

The various gears are generally formed via forging with machined teeth. The addition, the gears go through a subsequent heat treatment procedure to obtain a desired hardness. As such, the manufacturing process for the gears requires at least two completely separate manufacturing processes with the resulting parts being joined together via connecting fasteners and flanges. Thus, the aforementioned manufacturing techniques are complex and expensive. In addition, the heat treatment may cause dimensional distortion. In addition, conventional gearboxes require cylindrical and/or tapered roller bearing elements that are also complex, expensive, and often must be replaced in service.

Accordingly, an improved gearbox assembly for a wind turbine and method of manufacturing same that addresses the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for manufacturing a gear (such as a planet gear or sun gear) of a gearbox of a wind turbine. The method includes forming a base of the gear via at least one of casting or forging. The base of the gear includes an inner circumferential surface and an outer circumferential surface. Therefore, the outer circumferential surface of the gear includes a plurality of net or near-net gear teeth. The method also includes applying a coating material to at least a portion of the base of the gear and at least a portion of the plurality of gear teeth of the gear via an additive manufacturing process so as to increase a hardness of the portions of the base and the plurality of gear teeth that includes the coating material.

In one embodiment, the method also includes forming a journal bearing on the other of the inner circumferential surface or the outer circumferential surface opposite the plurality of gear teeth via the additive manufacturing process.

In another embodiment, the method may include forming the base of the gear with one or more voids through a thickness thereof defined between the inner circumferential surface and the outer circumferential surface so as to minimize the weight (and/or the cost) of the gear.

In further embodiments, the additive manufacturing process may include cold spraying, thermal spray, laser cladding, binder jetting, material jetting, directed energy deposition, powder bed fusion, or any other suitable additive manufacturing technique. In additional embodiments, the coating material may include boron nitride, aluminum oxide, silicon carbide, tungsten carbide, a nickel-based alloy, or any other suitable material that provides the desired hardness.

In several embodiments, the step of applying the coating material to at least a portion of the base of the gear and at least a portion of the plurality of gear teeth of the gear via the additive manufacturing process may include applying the coating material to at least one side of the plurality of gear teeth, a root of the gear teeth, or a tip of the gear teeth. In addition, the step of applying the coating material to at least a portion of the base of the gear and at least a portion of the plurality of gear teeth of the gear via the additive manufacturing process may include applying the coating material with varying thicknesses depending on a location of the gear (e.g. thinner on one side of the gear teeth or varying at the root of the teeth).

In certain embodiments, the method may also include forming the base of the gear from steel, cast steel, iron, ductile iron, or any other base material. In additional embodiments, the method may also include machining the plurality of gear teeth after applying the coating material. For example, such machining may include hobbing or grinding the plurality of gear teeth after applying the coating material.

In another aspect, the present disclosure is directed to a gearbox assembly. The gearbox assembly includes a planetary gear system includes a plurality of planet gears, at least one sun gear, at least one planetary carrier operatively coupled with the plurality of planet gears, and a plurality of pin shafts. At least one of the plurality of planet gears or the sun gear includes a base having an inner circumferential surface and an outer circumferential surface. The outer circumferential surface of at least one of the plurality of planet gears or the sun gear includes a plurality of gear teeth. In addition, the gearbox assembly includes a coating material applied on the plurality of gear teeth of at least one of the plurality of planet gears or the sun gear via an additive manufacturing process so as to provide a specified hardness to the plurality of gear teeth. It should also be understood that the gearbox assembly may further include any of the additional features described herein.

In yet another aspect, the present disclosure is directed to a method for manufacturing a planetary carrier for supporting a plurality of planet gears of a gearbox of a wind turbine. The method includes forming a base of the planetary carrier via at least one of casting or forging. The base of the planetary carrier includes an upwind end and downwind end. As such, the method also includes applying a coating material to the base and at least one of the upwind end or the downwind end to form a journal bearing thereon via an additive manufacturing process. It should also be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
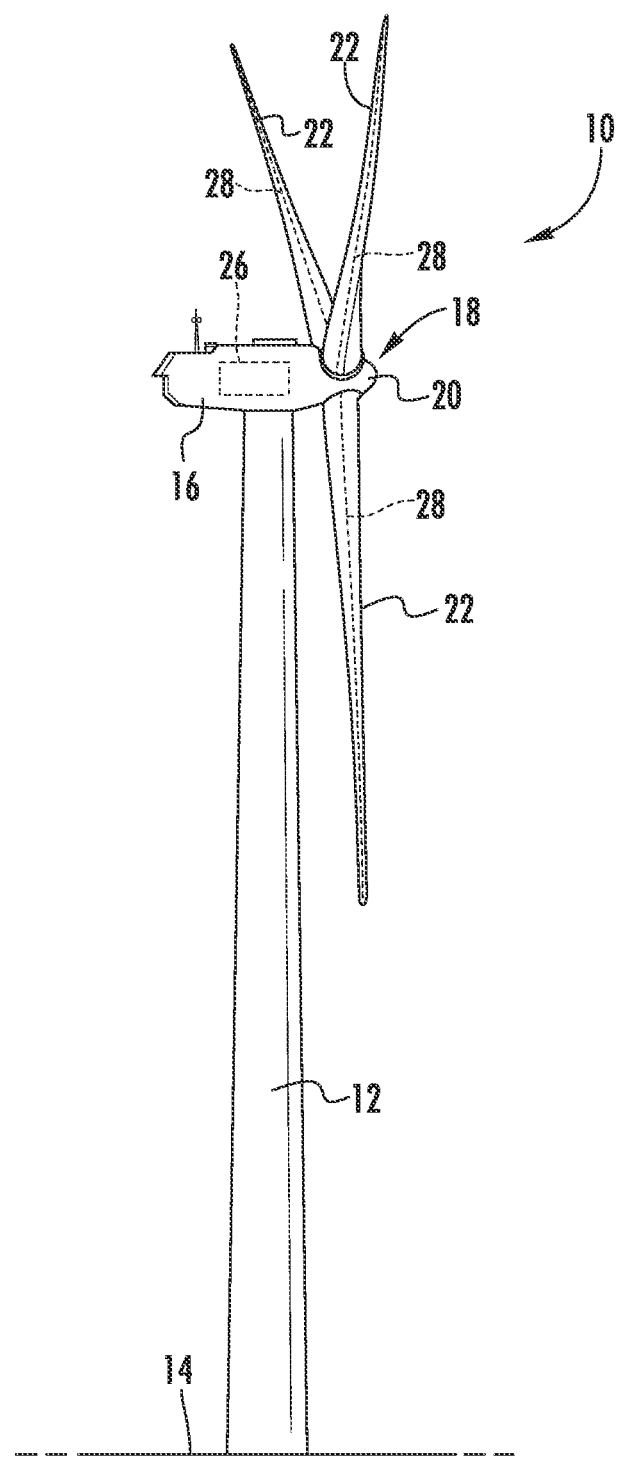
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a method for manufacturing a planet gear, sun gear, and/or helical gear of a gearbox of a wind turbine. The method includes forming a base of the gear via at least one of casting or forging. Further, the base of the gear includes an inner circumferential surface and an outer circumferential surface. Therefore, at least one of the inner circumferential surface or the outer circumferential surface of the gear includes a plurality of net or near-net gear teeth. The method also includes applying a coating material to the base and the plurality of gear teeth of the planet gear via an additive manufacturing process so as to increase a hardness of the base and the plurality of gear teeth.

Thus, the present disclosure provides many advantages not present in the prior art. For example, the hybrid-additive planet gear, sun gear, and/or helical gears formed via the present disclosure can replace conventional components made via forging alone. Further, the hybrid gears can be structurally optimized and may utilize inexpensive bulk material with a toroidal or cylindrical shape, which can be cast or forged. Layers of high-strength, wear-resistant additive material may be printed on the outer and/or inner diameter of the bulk material and then machined to form gear teeth or a journal bearing surface. Internal passages for lubrication may also be integrated into the bulk material to form passageways for lubrication and/or oil-wetting. This technique can also be used to integrate a journal bearing surface on the upwind and downwind sides of a gear carrier, in order to reduce or eliminate the need for tapered or cylindrical roller bearing elements.

Referring now to the drawings, FIG. 1 illustrates a perspective view of one embodiment of a wind turbine 10 according to conventional construction. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotation of the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
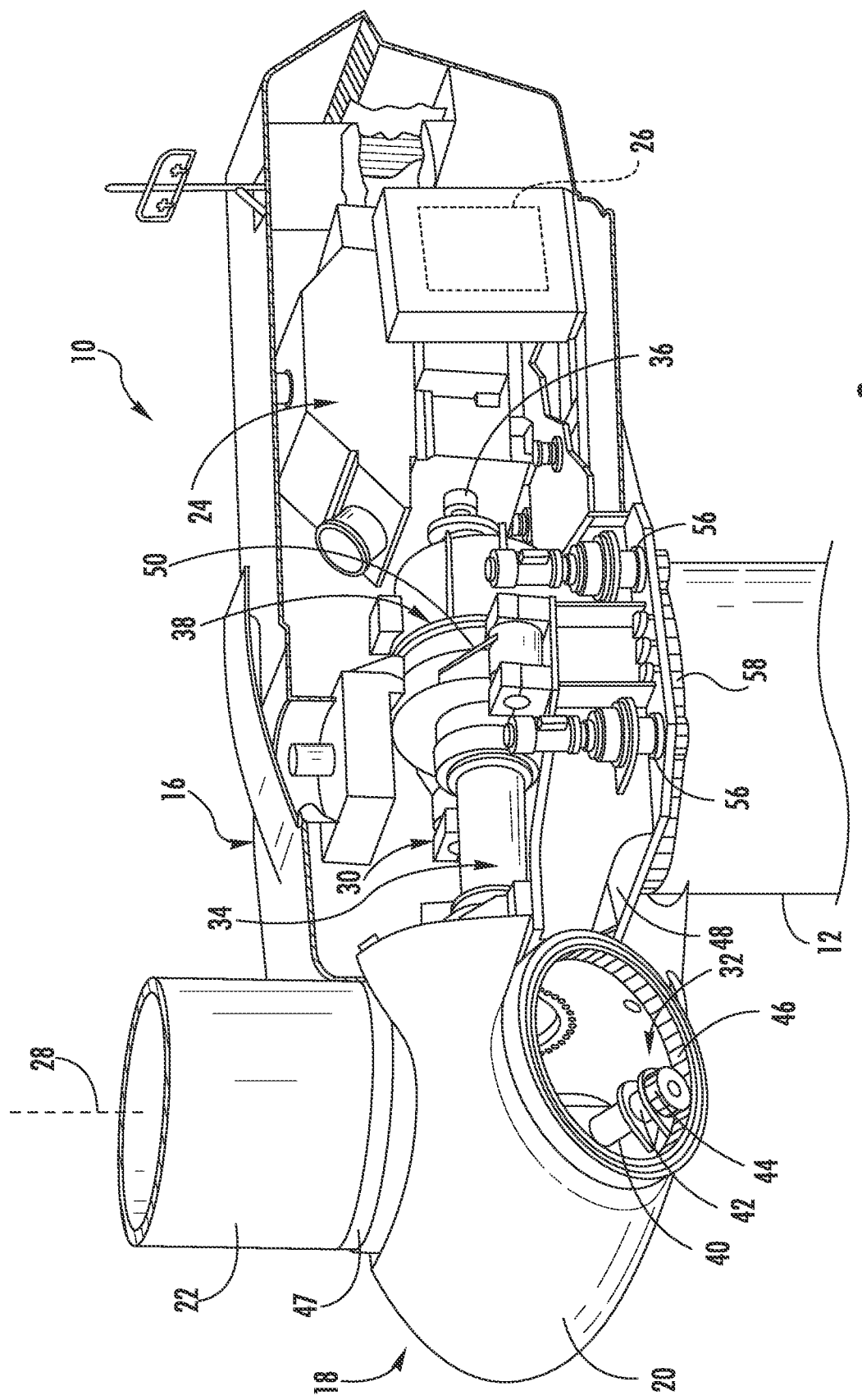
FIG. 2 illustrates a detailed, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, a drivetrain assembly 30 of the wind turbine 10 is housed within the nacelle 16. More specifically, as shown, the drivetrain assembly 30 includes the generator 24, which is coupled to the rotor 18 for producing electrical power from the rotational energy generated by the rotor 18. For example, as shown, the rotor 18 may include a rotor shaft 34 coupled to the hub 20 for rotation therewith. The rotor shaft 34 may, in turn, be rotatably coupled to a generator shaft 36 of the generator 24 through a gearbox 38 connected to a bedplate support frame 48 by a torque support 50. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 56 communicatively coupled to the controller 26, with each yaw drive mechanism(s) 56 being configured to change the angle of the nacelle 16 relative to the wind (e.g., by engaging a yaw bearing 58 of the wind turbine 10).

Figure 3:
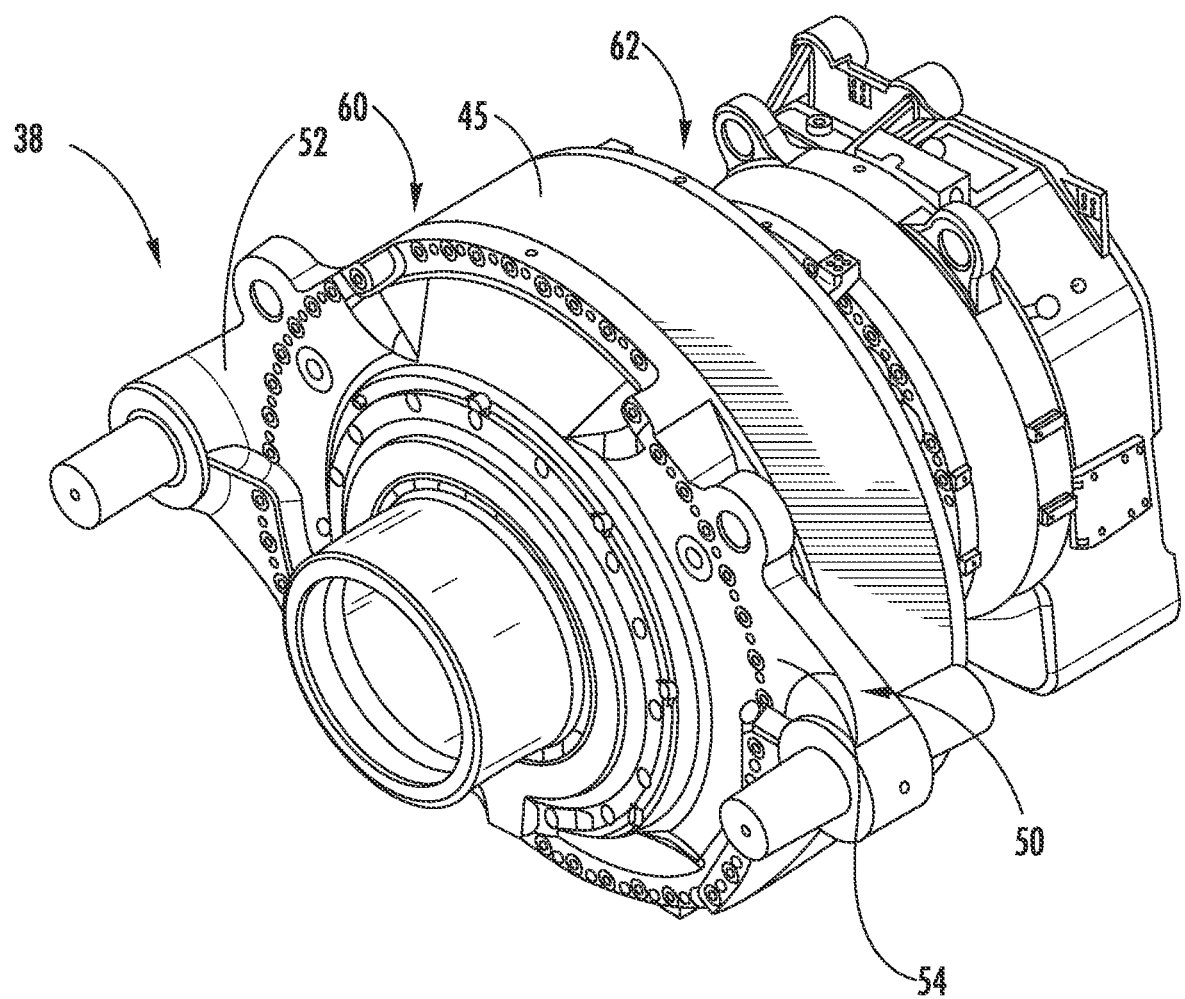
FIG. 3 illustrates a perspective view of one embodiment of a gearbox assembly of a wind turbine according to the present disclosure.
Figure 4:
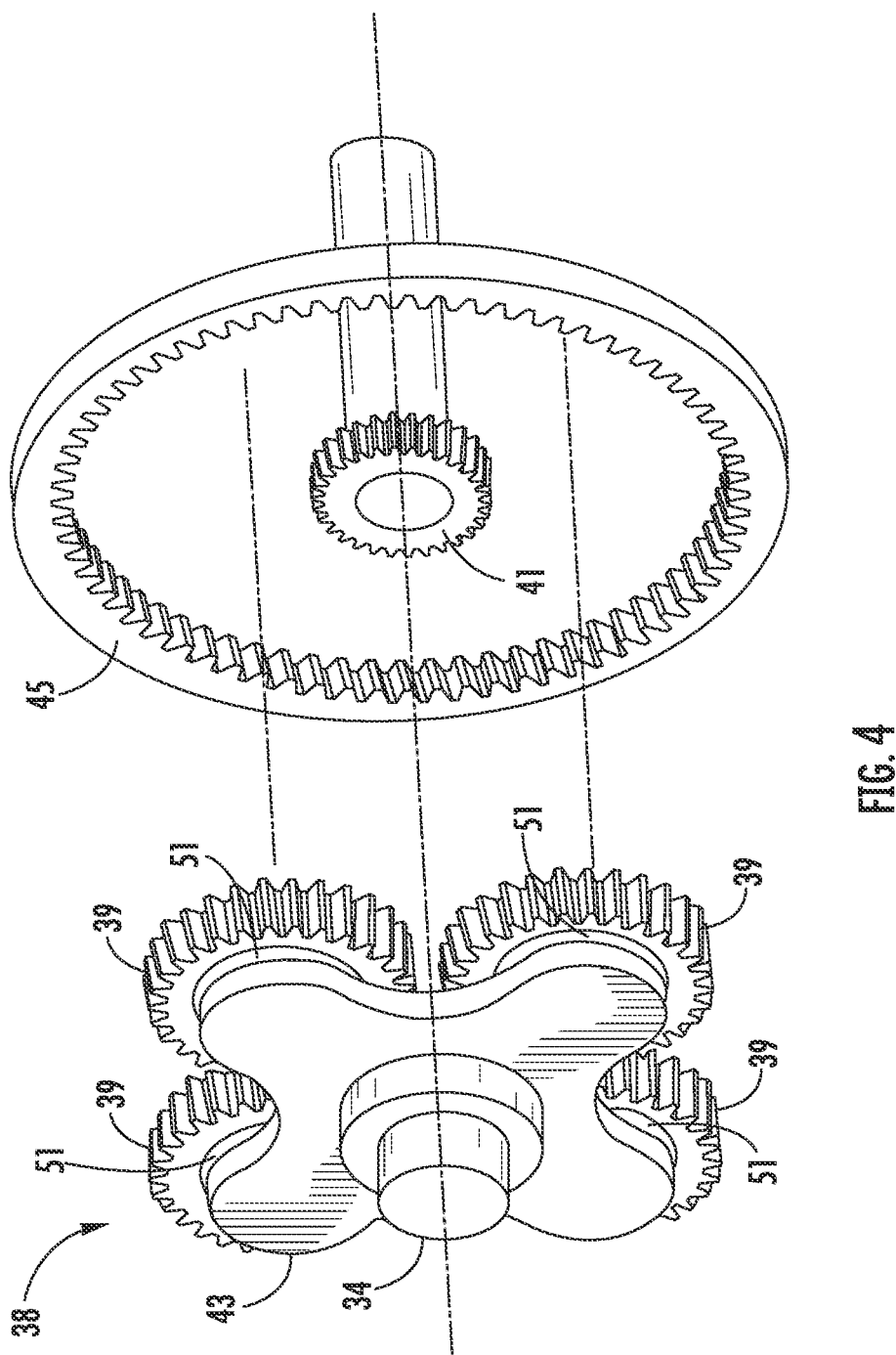
FIG. 4 illustrates an exploded view of one embodiment of a planetary gear system according to the present disclosure.

Referring now to FIGS. 3-10, various views of the components of the gearbox 38 according to the present disclosure are illustrated. As mentioned, the gearbox 38 may be secured to the bedplate support frame 48 via the torque support 50. In addition, as shown, the gearbox 38 may include a first stage gear assembly 60 and a second stage gear assembly 62. Thus, as shown in FIGS. 3 and 4, the first stage gear assembly 60 may include the torque support 50 and a main ring gear 45. More specifically, as shown, the torque support 50 may include a first torque arm 52 and a second torque arm 54 configured on opposing sides of the gearbox 38.

Referring particularly to FIG. 4, the gearbox 38 may include any suitable gear assembly that uses one or more gears and/or gear trains to provide speed and/or torque conversions from the rotor shaft 34 to the generator 24. For example, as shown, the gearbox 38 may include a planetary gear system having one or more outer or planet gears 39 revolving about a central or sun gear 41. In addition, the planet gears 39 are typically mounted on a movable arm or carrier 43 which itself may rotate relative to the sun gear 41. Moreover, as shown, each individual planet gear 39 may be mounted around a pin shaft 51 so as to individually rotate around its respective pin shaft 51. The gearbox 38 may also include at least one outer ring gear 45 configured to mesh the planet gears 39. More specifically, as shown, the ring gear 45 may include a set of gear teeth on an inner circumferential surface thereof that are configured to mesh with corresponding teeth of the planet gears 39. In addition, as shown in FIG. 3, as mentioned, the gearbox 38 may also include a second stage gear assembly 62. Similar to the first stage gear assembly 60, the second stage gear assembly 62 may also include a secondary ring gear 65 and a separate casing or housing 64 connected to the ring gear 65 by a flange 66.

Figure 5:
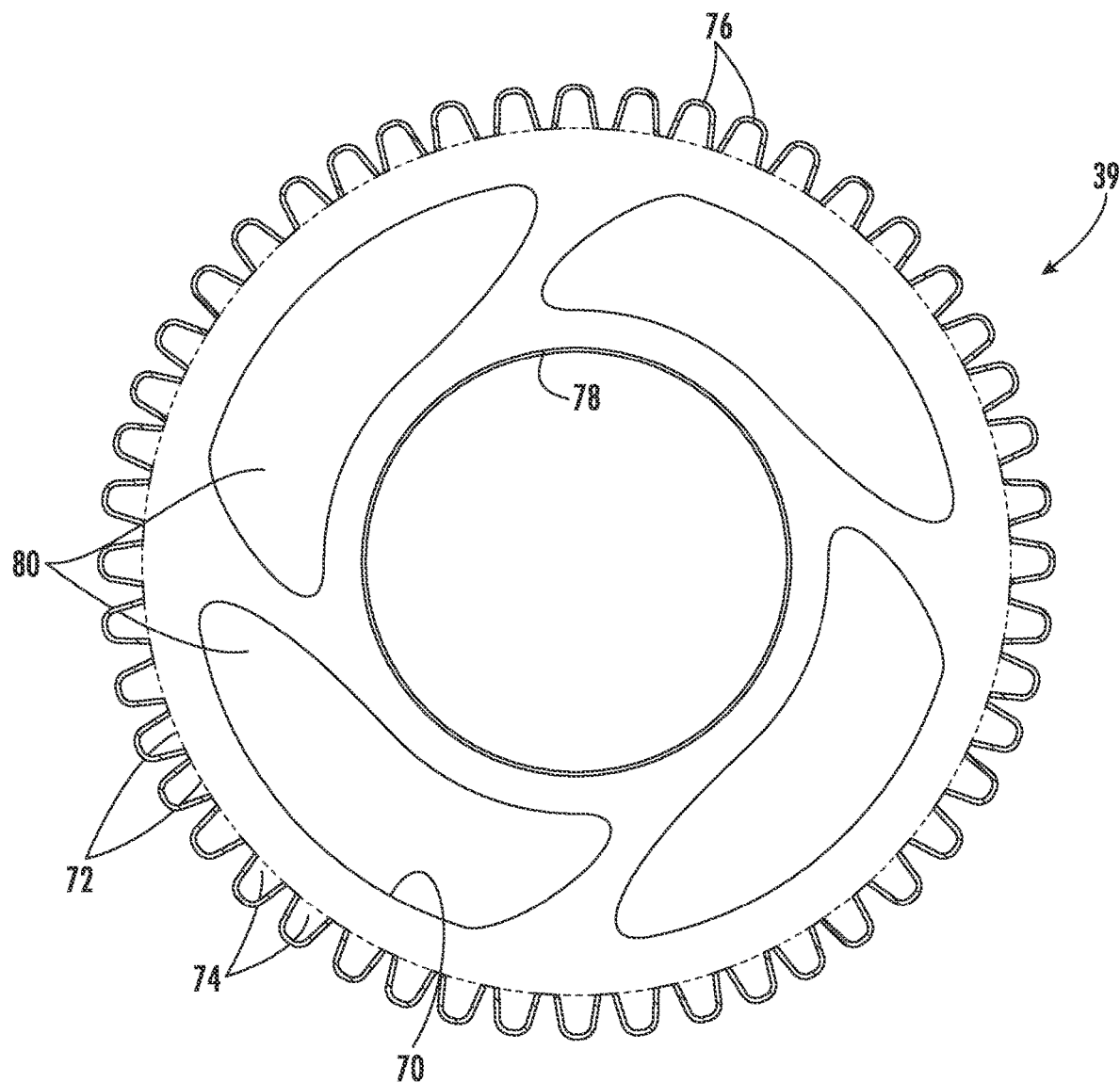
FIG. 5 illustrates a front view of one embodiment of a planet gear of a gearbox of a wind turbine according to the present disclosure.

Referring particularly to FIG. 5, each of the planet gear(s) 39 includes a base 68 having opposing inner and outer circumferential surfaces 70, 72 and a plurality of gear teeth 74 on one or both of the circumferential surfaces 70, 72. For example, as shown, the gear teeth 74 are located on the outer circumferential surface 72 so as to mesh with the ring gear 45.

Figure 6:
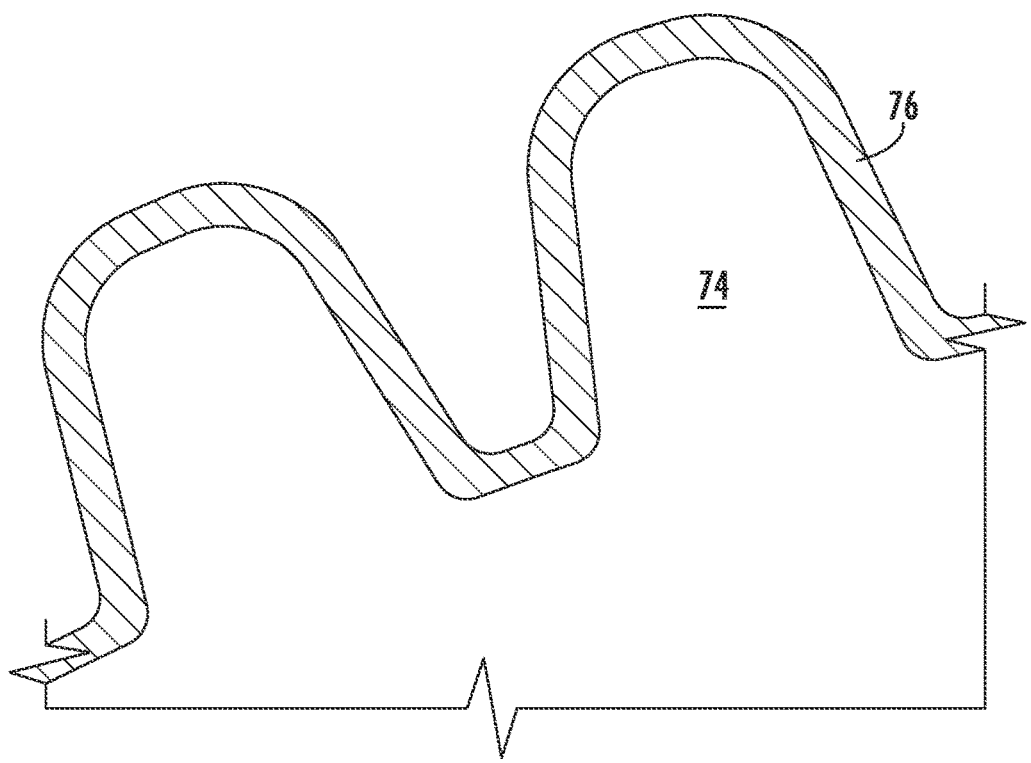
FIG. 6 illustrates a partial, front view of one embodiment of the gear teeth of a gear of wind turbine gearbox according to the present disclosure.
Figure 7:
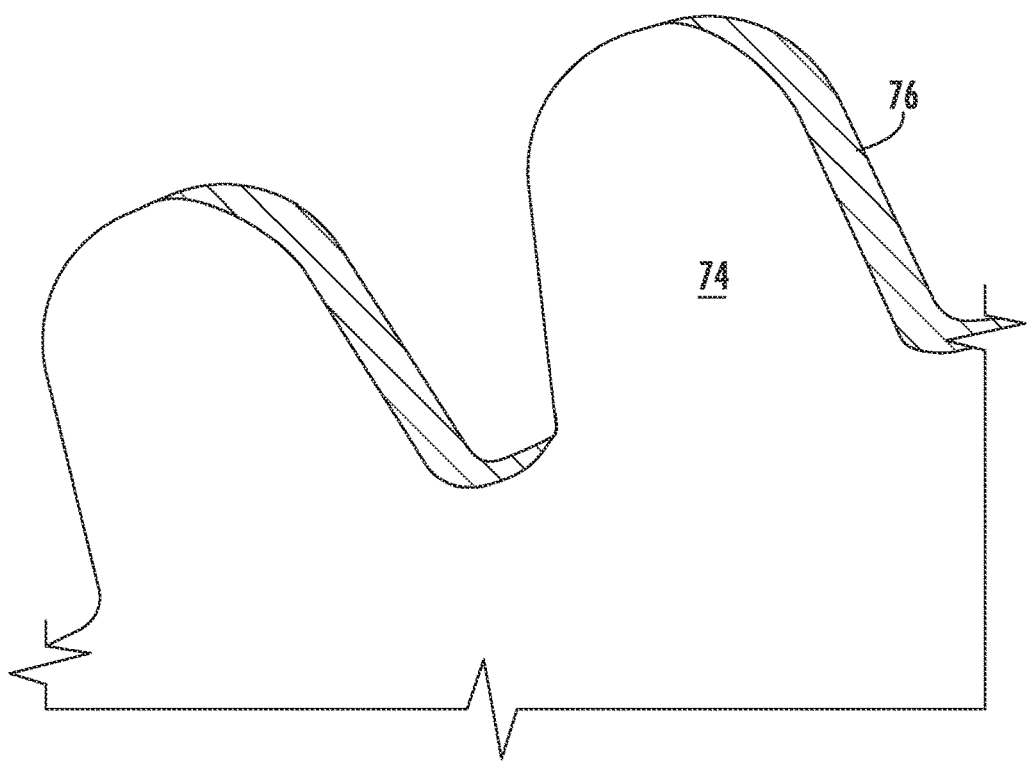
FIG. 7 illustrates a partial, front view of one embodiment of the gear teeth of a gear of wind turbine gearbox according to the present disclosure.
Figure 8:
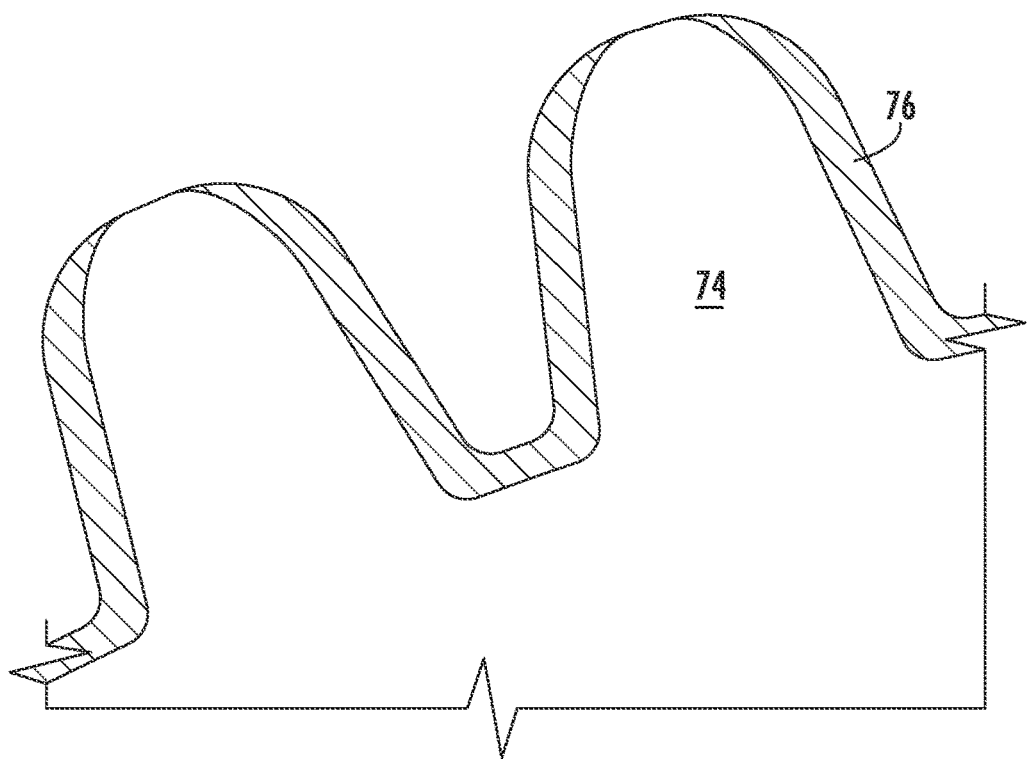
FIG. 8 illustrates a partial, front view of one embodiment of the gear teeth of a gear of wind turbine gearbox according to the present disclosure.
Figure 9:
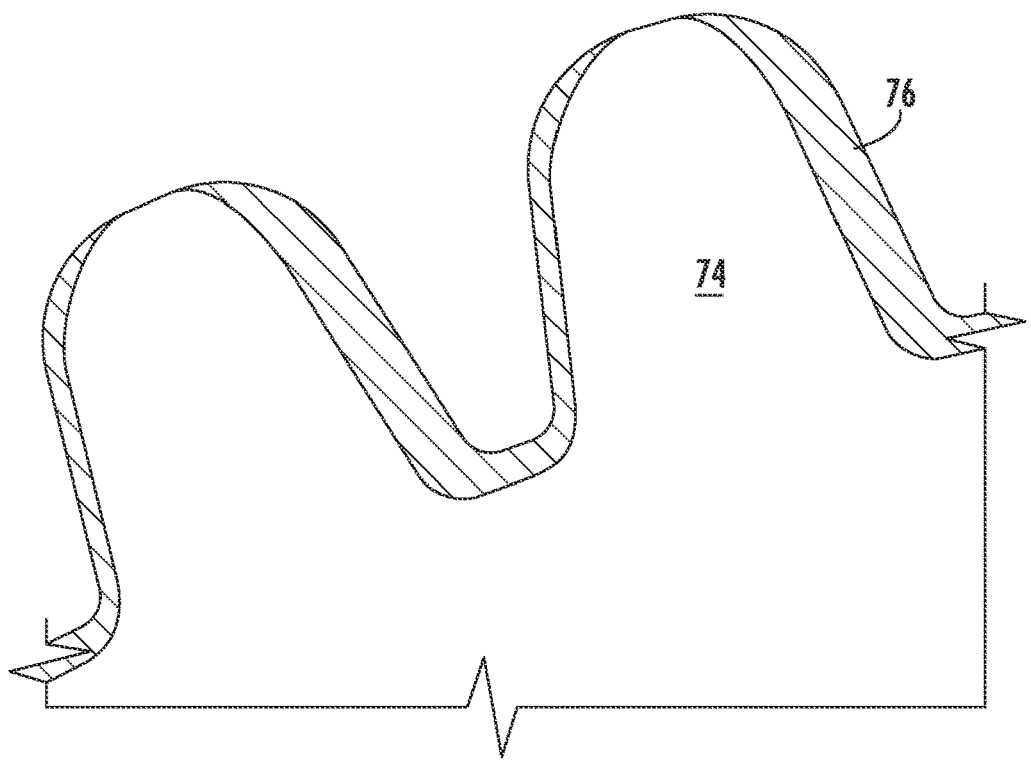
FIG. 9 illustrates a partial, front view of one embodiment of the gear teeth of a gear of wind turbine gearbox according to the present disclosure.

In addition, as shown in FIGS. 5-10, the planet gear 39 includes a coating material 76 applied on the base 68 and/or portions of the gear teeth 74 via an additive manufacturing process so as to provide a desired hardness to various regions of the planet gear 39 and associated teeth. More specifically, as shown in FIG. 6, the coating material 76 may be applied to completely cover the base 68 and the gear teeth 74. In another embodiment, as shown in FIG. 7, the coating material 76 may be applied to only one side of the gear teeth 74. In addition, as shown, the coating material 76 can be printed with a varied thickness at the root or base of the teeth 74. In a further embodiment, as shown in FIG. 8, the coating material 76 may be applied to the base 68 of the gear 39 and the sides of the gear teeth 74 with the tips of the teeth 74 absent of the coating material 76. In yet another embodiment, as shown in FIG. 9, the coating material 76 may be applied with varying thicknesses on opposing sides of the gear teeth 74. Such variations in the coating material 76 are made possible via the additive manufacturing process. In one embodiment, the coating material(s) 76 may include boron nitride, aluminum oxide, silicon carbide, tungsten carbide, a nickel-based alloy, and/or combinations thereof, as well as any other material for providing a desired hardness to desired regions of the planet gear 39.

Figure 10:
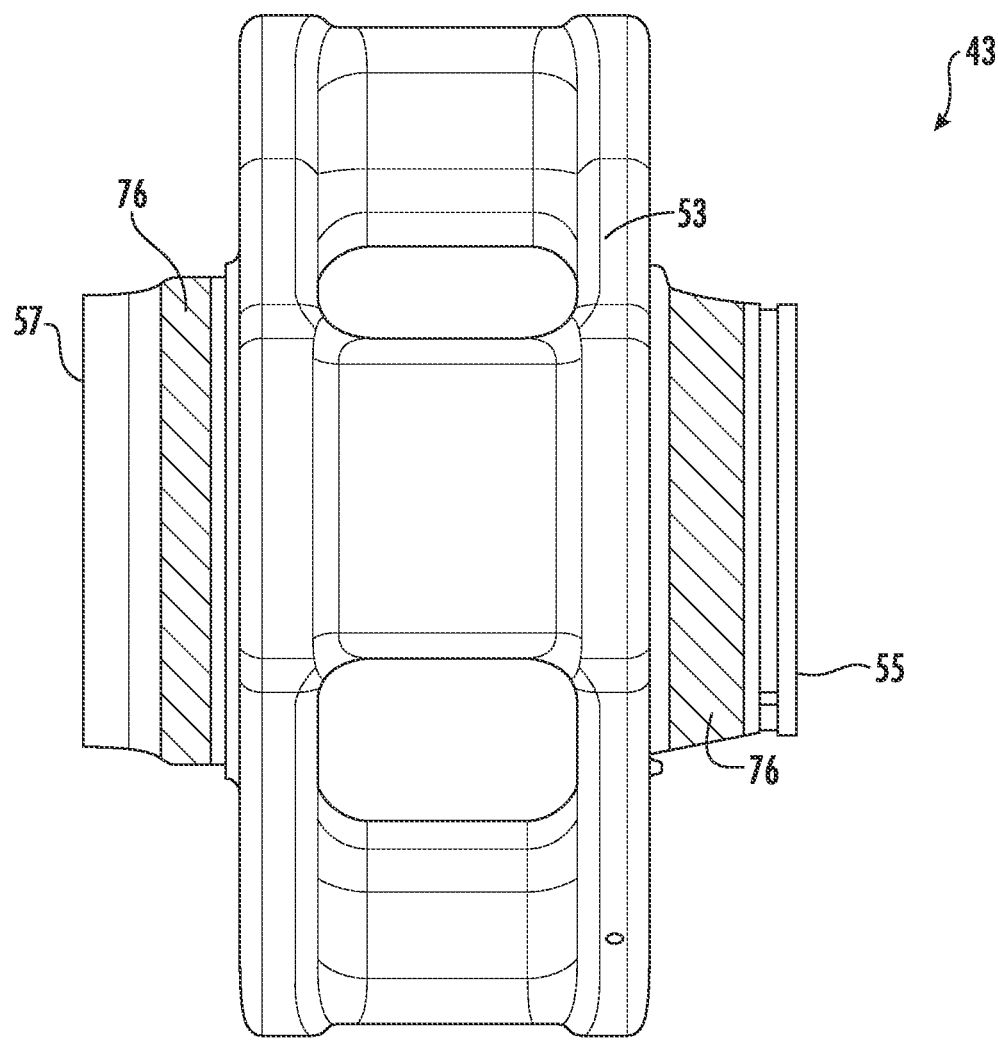
FIG. 10 illustrates a side view of one embodiment of a planetary carrier of a gearbox of a wind turbine according to the present disclosure, particularly illustrating a coating material applied to upwind and downwind ends thereof via additive manufacturing.

Referring now to FIG. 10, the planetary carrier 43 may also include a base 53 having an upwind end 55 and a downwind end 57. In addition, as shown, either or both of the upwind or downwind ends 55, 57 may include the coating material 76 printed thereon so as to form a journal bearing. As such, the printed journal bearing is configured to reduce or eliminate the need for tapered or cylindrical roller bearing elements at the upwind and downwind ends 55, 57.

Figure 11:
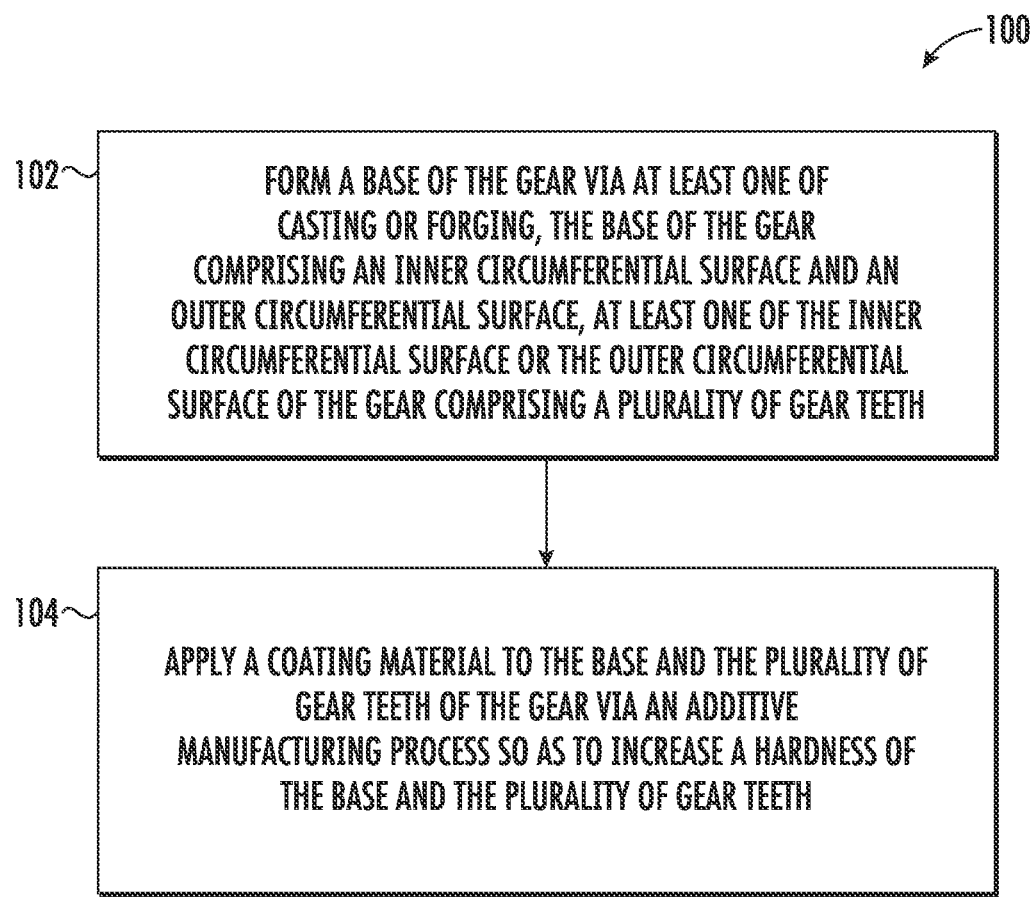
FIG. 11 illustrates a flow diagram of one embodiment of a method for manufacturing a planet gear of a gearbox of a wind turbine according to the present disclosure.

Referring now to FIG. 11, a flow diagram of one embodiment of a method 100 for manufacturing a planet gear, a sun gear, or a helical gear of the gearbox of the wind turbine is illustrated in accordance with aspects of the present subject matter. In general, the method 100 will be described herein with reference to the planet gear 39 shown in FIGS. 3-9. However, in other embodiments, the method 100 may be used in connection with any other suitable gear or gears having any other suitable gear configuration and/or with any other suitable system having any other suitable system configuration.

It should be appreciated that, although FIG. 11 depicts manufacturing steps or functions performed in a particular order for purposes of illustration and discussion, the manufacturing steps discussed herein are not limited to any particular order or arrangement. One skilled in the art, using the disclosures provided herein, will appreciate that various steps or functions of the methods disclosed herein can be omitted, rearranged, combined, and/or adapted in various ways without deviating from the scope of the present disclosure.

As shown at 102, the method 100 includes forming the base 68 of the planet gear 39 via casting, forging, or any other suitable manufacturing process. In such embodiments, casting of the planet gear(s) 39 may include pouring a liquid material into a mold of the planet gear 39 and allowing the liquid material to solidify in the mold. Alternatively, forging of the planet gear(s) 39 includes forming the shape of the gear by heating the gear material in a fire or furnace and applying force to the heated material to shape it into the desired shape. Accordingly, in certain embodiments, the planet gear(s) 39 may be constructed of steel, cast steel, iron, ductile iron, or any other suitable material.

Once formed, as mentioned, the base 68 of the planet gear 39 includes inner and outer circumferential surfaces 70, 72 with one of the circumferential surfaces having net or near-net gear teeth (i.e. the teeth are close to the final (net) shape, thereby reducing the need for surface finishing). As such, the near net shape reduces required finishing, such as machining or grinding. Thus, as shown at 104, the method 100 may include applying the coating material 76 to the base 68 and the gear teeth 74 of the planet gear via an additive manufacturing process so as to increase a hardness of the base 68 and the gear teeth 74. As used herein, an additive manufacturing process generally refers to processes used to deposit materials under computer control to create a shape. Thus, the additive manufacturing processes described herein may include cold spraying, thermal spray, laser cladding, binder jetting, material jetting, directed energy deposition, powder bed fusion, or any other suitable additive manufacturing process. More specifically, in one embodiment, the coating material 76 may be applied to the planet gear 39 via cold spraying.

In particular embodiments, the method 100 may include minimally machining the gear teeth 74 after applying the coating material 76. More specifically, in such embodiments, the method 100 may include hobbing and/or grinding the gear teeth 74, if needed, after applying the coating material 76. Thus, the additional machining is configured to achieve the micro-geometry of the gears.

The method 100 may also include forming a journal bearing 78 on the other of the inner or outer circumferential surfaces 70, 72, i.e. opposite the gear teeth 74, via the additive manufacturing process (FIG. 5). As such, by printed the journal bearing 78 directly to the surface of the gear 39, the gear design is simplified and quicker to manufacture. In addition, as shown, the method 100 may further include forming the base 68 of the planet gear 39 with one or more voids 80 in a thickness thereof defined between the inner and outer circumferential surfaces 70, 72. Such voids 80 are configured to minimize the weight (and/or the cost) of the planet gear 39.

Figure 12:
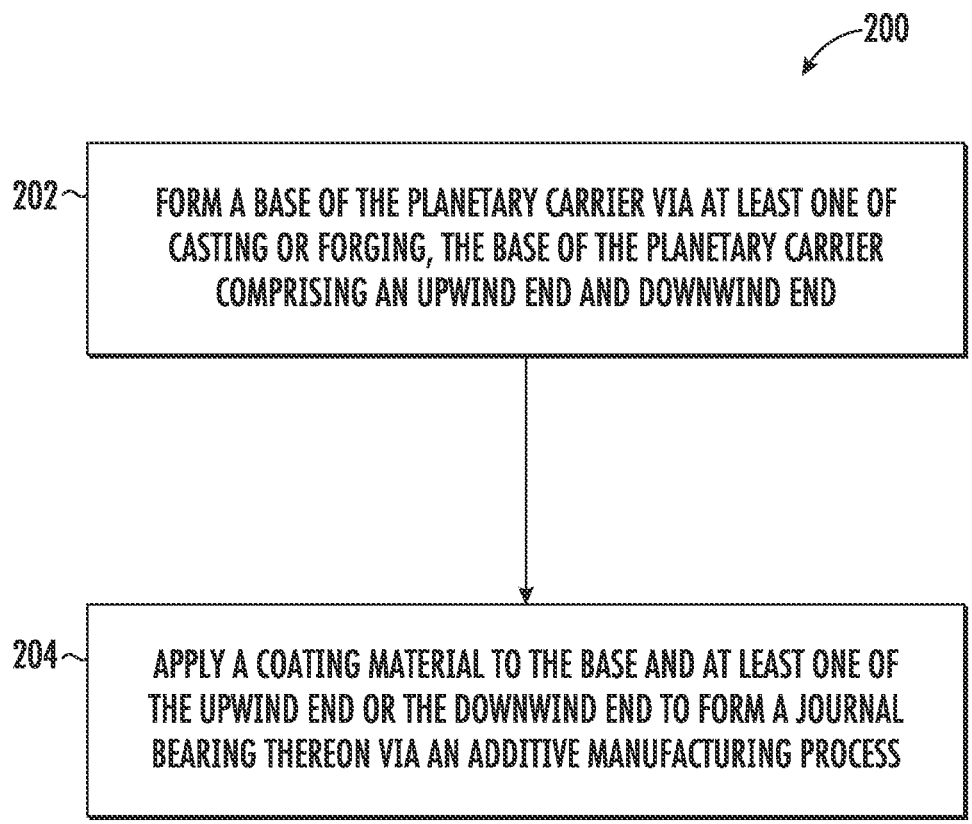
FIG. 12 illustrates a flow diagram of another embodiment of a method for manufacturing a planetary carrier for supporting a plurality of planet gears of a gearbox of a wind turbine according to the present disclosure.

Referring now to FIG. 12, a flow diagram of one embodiment of a method 200 for manufacturing a planetary carrier for supporting a plurality of planet gears of a gearbox of a wind turbine is illustrated in accordance with aspects of the present subject matter. In general, the method 200 will be described herein with reference to the planetary carrier 43 shown in FIGS. 4 and 10. However, in other embodiments, the method 200 may be used in connection with any other suitable planetary carriers having any other suitable carrier configuration and/or with any other suitable system having any other suitable system configuration.

It should be appreciated that, although FIG. 12 depicts manufacturing steps or functions performed in a particular order for purposes of illustration and discussion, the manufacturing steps discussed herein are not limited to any particular order or arrangement. One skilled in the art, using the disclosures provided herein, will appreciate that various steps or functions of the methods disclosed herein can be omitted, rearranged, combined, and/or adapted in various ways without deviating from the scope of the present disclosure.

As shown at 202, the method 200 includes forming a base 53 of the planetary carrier 43 via casting, forging, or any other suitable manufacturing process. More specifically, as mentioned, the base 53 of the planetary carrier 43 includes upwind and downwind ends 55, 57. As such, the method 100 may also include applying the coating material 76 to the base 53 and either or both of the upwind and downwind ends 55, 57 to form a journal bearing thereon via any of the additive manufacturing processes described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a gear of a gearbox of a wind turbine, the gear comprising at least one of a planet gear or a sun gear, the method comprising:

forming a base of the gear via at least one of casting or forging, the base of the gear comprising an inner circumferential surface and an outer circumferential surface, the outer circumferential surface of the gear comprising a plurality of gear teeth;

applying a coating material to at least a portion of the base of the gear and at least a portion of the plurality of gear teeth of the gear via an additive manufacturing process so as to increase a hardness of the portions of the base and the plurality of gear teeth that includes the coating material; and wherein the coating material comprises at least one of boron nitride, aluminum oxide, silicon carbide, tungsten carbide, or a nickel-based alloy; and machining the plurality of gear teeth after applying the coating material.

2. The method of claim 1, further comprising forming a journal bearing on the other of the inner circumferential surface or the outer circumferential surface opposite the plurality of gear teeth via the additive manufacturing process.

3. The method of claim 1, further comprising forming the base with one or more voids through a thickness thereof defined between the inner circumferential surface and the outer circumferential surface so as to minimize a weight of the gear.

4. The method of claim 1, wherein the additive manufacturing process comprises at least one of cold spraying, thermal spray, laser cladding, binder jetting, material jetting, directed energy deposition; or powder bed fusion.

5. The method of claim 1, wherein applying the coating material to at least a portion of the base of the gear and at least a portion of the plurality of gear teeth of the gear via the additive manufacturing process further comprises applying the coating material to at least one side of the plurality of gear teeth, a root of the gear teeth, or a tip of the gear teeth.

6. The method of claim 1, wherein applying the coating material to at least a portion of the base of the gear and at least a portion of the plurality of gear teeth of the gear via the additive manufacturing process further comprises applying the coating material with varying thicknesses on the base or ole each of the gear teeth depending on a location of the gear within the wind turbine.

7. The method of claim 1, further comprising forming the base of the gear from at least one of steel, cast steel, iron, or ductile iron.

8. The method of claim 1, wherein the machining the plurality of gear teeth further comprises at least one of hobbing or grinding the plurality of gear teeth after applying the coating material.

9. A method for manufacturing a planetary carrier for supporting a plurality of planet gears of a gearbox of a wind turbine, the method comprising:

forming a base of the planetary carrier via at least one of casting or forging, the base of the planetary carrier comprising an upwind end and downwind end;

applying a coating material to the base and at least one of the upwind end or the downwind end to form a journal bearing thereon via an additive manufacturing process; and machining the base and the at least one the upwind end or the downwind end after applying the coating material.

10. The method of claim 9, wherein the additive manufacturing process comprises at least one of cold spraying, thermal spray, laser cladding, binder jetting, material jetting, directed energy deposition, or powder bed fusion.

11. The method of claim 9, wherein the coating material comprises at least one of boron nitride, aluminum oxide, silicon carbide, tungsten carbide, or a nickel-based alloy.

12. The method of claim 9, further comprising forming the base of the planetary carrier from at least one of steel, cast steel, iron, or ductile iron.

* * * * *